(12) United States Patent
Rajatheva (10) Patent No.: US 10,516,554 B2
(45) Date of Patent: Dec. 24, 2019

(54) METHOD AND NODE IN A WIRELESS COMMUNICATION NETWORK

(71) Applicant: Huawei Technologies Co., Ltd., Shenzhen (CN)

(72) Inventor: Premanandana Rajatheva, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/137,890

(22) Filed: Sep. 21, 2018

(65) Prior Publication Data

US 2019/0020512 A1     Jan. 17, 2019

Related U.S. Application Data

(63) Continuation of application No. PCT/EP2016/056610, filed on Mar. 24, 2016.

(51) Int. Cl.
*H04L 25/03* (2006.01)
*H04B 7/0417* (2017.01)
*H04L 25/02* (2006.01)
*H04B 3/32* (2006.01)
*H04B 1/12* (2006.01)

(52) U.S. Cl.
CPC ..... *H04L 25/03133* (2013.01); *H04B 7/0417* (2013.01); *H04L 25/0202* (2013.01);
(Continued)

(58) Field of Classification Search
CPC ..... H04B 1/123; H04B 3/32; H04L 25/03343; H04L 27/2601; H04L 5/023; H04M 11/062
(Continued)

(56) References Cited

U.S. PATENT DOCUMENTS

2003/0235255 A1   12/2003   Ketchum et al.
2011/0310994 A1*  12/2011   Ko .................. H04B 7/0639
                                                           375/295
(Continued)

FOREIGN PATENT DOCUMENTS

GB        2362077 A      11/2001

OTHER PUBLICATIONS

Forney, "Maximim-Likelihood Sequence Estimation of Digital Sequences in the Presence of Intersysmbol Interference," IEEE Transactions on Information Theory, vol. IT-18, pp. 363-378, Institute of Electrical and Electronics Engineers, New York, New York (May 1972).

(Continued)

*Primary Examiner* — Leila Malek
(74) *Attorney, Agent, or Firm* — Leydig, Voit & Mayer, Ltd.

(57) ABSTRACT

Transmitting device for a wireless communication system and method therein for transmitting data. The transmitting device comprises a processor, configured to: obtain a channel response (h); determine pre-processing coefficients ($g_0$, $g_1$, $g_2$) of a pre-processor structure, based on the obtained channel response (h); and pre-process the data, based on the pre-processor structure and the determined pre-processing coefficients ($g_0$, $g_1$, $g_2$). The transmitting device comprises a transmitter, configured to transmit the pre-processed data.

13 Claims, 9 Drawing Sheets

100

110 Transmitting device

120 Receiving device (52) U.S. Cl.
CPC .. *H04L 25/03121* (2013.01); *H04L 25/03343* (2013.01); *H04B 1/123* (2013.01); *H04B 3/32* (2013.01); *H04L 2025/03433* (2013.01); *H04L 2025/03598* (2013.01)

(58) Field of Classification Search
USPC ........................................................ 375/229
See application file for complete search history.

(56) References Cited

U.S. PATENT DOCUMENTS

| | | | | |
|---|---|---|---|---|
| 2013/0121441 | A1* | 5/2013 | Murakami | H04L 1/007 375/296 |
| 2014/0029651 | A1 | 1/2014 | Zhong | |
| 2016/0094318 | A1* | 3/2016 | Shattil | H04B 7/026 375/267 |

OTHER PUBLICATIONS

Proakis, "Digital Communications, Chapter 10: Communication Through Band-Limited Channels," 3rd edition, McGraw Hill, pp. 587-599 (1995).

Sun, "Lower Bounds for the Minimal Eigenvalue of a Hermitian Positive-Definite Matrix", IEEE Transactions on Information Theory, vol. 46, No. 7, pp. 2760-2762, Institute of Electrical and Electronics Engineers, New York, New York (Nov. 2000).

Rajatheva et al., "Distance Properties of Finite-Impulse Response Channels," IEEE Transactions on Communications, vol. 48, No. 9, pp. 1429-1431, Institute of Electrical and Electronics Engineers, New York, New York (Sep. 2000).

Said et al., "Bandwidth-Efficient Coded Modulation with Optimized Linear Partial-Response Signals," IEEE Transactions on Information Theory, vol. 44, No. 2, pp. 701-713, Institute of Electrical and Electronics Engineers, New York, New York (Mar. 1998).

Rajatheva, "The Worst Case ISI channels and the Uniqueness of the Corresponding Minimum Eigenvalue," http://arxiv.org/abs/1304.5416, pp. 1-3 (Apr. 19, 2013).

Rusek et al., "Coded Optimal Partial Response Signaling," International Symposium on Information Theory, Chicago, USA, Institute of Electrical and Electronics Engineers, New York, New York (Jun. 27-Jul. 2, 2004).

Larsson, "A State-Space Partitioning Approach to Trellis Decoding," Technical report No. 222, Chalmers University of Technology, Sweden, pp. 1-188, (1991).

* cited by examiner

METHOD AND NODE IN A WIRELESS COMMUNICATION NETWORK

CROSS-REFERENCE TO RELATED APPLICATIONS

This application is a continuation of International Application No. PCT/EP2016/056610, filed on Mar. 24, 2016, the disclosure of which is hereby incorporated by reference in its entirety.

TECHNICAL FIELD

Implementations described herein generally relate to a transmitting device and a method therein. In particular is herein described a mechanism for wireless transmission of data from the transmitting device to a receiving device.

BACKGROUND

As the amount of information to be exchanged increases, the required data rates also increases. Increased data rates put considerable strains on the resources of the communication systems. One of the scarce resources is the available bandwidth. The bandwidth is always available in limited quantities. Therefore, high-speed communication in a limited bandwidth environment is an important subject for research. It is well known that under these conditions Inter-Symbol Interference (ISI) is a major cause of performance degradation.

The minimum Euclidean distance between any two symbol sequences is an important parameter to consider in order to design a technique to overcome ISI, especially when the signal to noise ratios are moderate to high level for a radio link between a transmitting device and a receiving device. Normally, as ISI increases the minimum Euclidean distance decreases.

A finite length ISI channel can be represented as a discrete time transversal filter for a given channel impulse response. An important parameter that defines the receiving device performance, in terms of Bit Error Rate (BER) versus Signal to Noise Ratio (SNR), is the minimum Euclidean distance between any two symbol sequences. It can be shown that certain channel responses give the worst minimum Euclidean distance.

Channel response is same as channel impulse response in this document. Channel impulse response is the impulse response of the channel between the transmitting device and the receiving device.

In signal processing, the impulse response, or impulse response function, of a dynamic system is its output when presented with a brief input signal, called an impulse. More generally, an impulse response refers to the reaction of any dynamic system in response to some external change. In both cases, the impulse response describes the reaction of the system as a function of time (or possibly as a function of some other independent variable that parameterizes the dynamic behaviour of the system).

It is known that minimum Euclidean distance strictly decreases with ISI. Hence it is clear that when the ISI is large the deterioration of the receiving device could be very high with a limiting channel capacity of zero for certain channel responses.

On the other hand, it is possible to show the existence of cases where the distance achieves a maximum for any length of finite interference and hence those are expected to perform essentially the same as channels without ISI. Naturally then the question is whether it is possible to make those channels which perform poorly into better ones.

Several solutions for lowering ISI exist. The main solution of lowering ISI is through channel equalisation where the ISI is compensated at the receiving device. Usually the optimal equaliser employing the Viterbi algorithm can provide a satisfying equalisation performance.

The problem with Viterbi algorithm based equalising is that the complexity of the algorithm is exponentially proportional to channel memory of the length of ISI. When the ISI is severe the Viterbi algorithm based solutions can result in very complicated receiving devices or those solutions will not give good performance with receiving device with low to moderate complexity.

By introducing complex pre-processing algorithms, the channel may be improved. However, increased complexity puts more demands (and thereby also costs) in particular at the receiving device side. It would thus be desired to find a way of improving the channel between a transmitting device and a receiving device without substantially increasing receiving device complexity.

SUMMARY

It is therefore an object to obviate at least some of the above mentioned disadvantages and to improve transmission of data between transmitting device and receiving device.

This and other objects are achieved by the features of the appended independent claims. Further implementation forms are apparent from the dependent claims, the description and the figures.

According to a first aspect, a transmitting device for a wireless communication system is provided, for transmitting data. The transmitting device comprises a processor, which is configured to obtain a channel response. Further, the processor is configured to determine preprocessing coefficients of a pre-processor structure, based on the obtained channel response. In addition, the processor is furthermore configured to pre-process data to be transmitted, based on the pre-processor structure and the determined pre-processing coefficients.

Pre-processing in the current context means that the signal is processed before it is transmitted from the transmitting device into the channel.

The transmitting device also comprises a transmitter, configured to transmit the pre-processed data.

An advantage of the described aspect, data to be transmitted to a receiving device may be pre-processed before transmission, using a pre-processor structure with low complexity. Thereby, the receiving device may use a less advanced processor for decoding the received data, leading to reduced production costs for the receiving device. Also, simplified decoding at the receiving device means shorter processing time, leading to an enhanced user experience. Further, a briefer processing time during decoding will lead to reduced usage of battery power, leading to prolonged operative battery life time between recharge at the receiver side. Thereby data transmission between transmitting device and receiving device is improved.

In a first possible implementation of the transmitting device according to the first aspect, the processor is further configured to select a pre-processor structure, based on the obtained channel response. The processor is in addition configured to inform a receiving device about the selected pre-processor structure.

By adapting pre-processor structure to the obtained, i.e. received channel response, a more appropriate pre-processor structure may be selected and used for the pre-processing, leading to reduced ISI and thereby further improved data transmission between the involved entities.

In a second possible implementation of the transmitting device according to the first aspect, or the first possible implementation of the transmitting device according to the first aspect, wherein the transmitting device operates in a Frequency Division Duplex (FDD) mode, the transmitter is further configured to transmit a pilot signal. The transmitting device according to the second possible implementation further comprises a receiver configured to obtain/receive the channel response based on the transmitted pilot signal.

It is thereby further specified how the transmitting device may be further improved in an FDD mode environment in order to further improve data transmission.

In a third possible implementation of the transmitting device according to the first aspect, or any of the previously described possible implementations thereof, wherein the transmitting device operates in a Time Division Duplex mode, the transmitting device further comprises a receiver configured to receive an uplink pilot signal from a receiving device. In addition, the processor is configured to obtain the channel response by computing it based on the received uplink pilot signal.

It is thereby further specified how the transmitting device may be further improved in a TDD mode environment.

In a fourth possible implementation of the transmitting device according to the first aspect, or any of the previously described possible implementations thereof, the processor is in addition configured to pre-process the data, based on the pre-processor structure and the determined pre-processing coefficients as follows: $a_k = g_0 \cdot u_k + g_1 \cdot u_{k-1}$, where $g_0$ and $g_1$ are the pre-processing coefficients, $u_k$ and $u_{k-1}$ are input data, k is an index and $a_k$ is the pre-processed data to be transmitted.

By using a two-step pre-processor structure for the pre-processing of the data to be transmitted, computation complexity is reduced, leading to further enhanced advantages associated with low complexity of the receiving device.

In a fifth possible implementation of the transmitting device according to the first aspect, or any of the previously described possible implementations thereof, the processor is in addition configured to pre-process the data, based on the pre-processor structure and the determined pre-processing coefficients as follows: $a_k = g_0 \cdot u_k + g_1 \cdot u_{k-1} + g_2 \cdot u_{k-2}$, where $g_0$, $g_1$ and $g_2$ are the pre-processing coefficients, $u_k$, $u_{k-1}$ and $u_{k-2}$ are input data, k is an index and $a_k$ is the pre-processed data to be transmitted.

By using a three-step pre-processor structure for the pre-processing, ISI is further reduced while computation complexity at the receiving device is kept rather low.

In a sixth possible implementation of the transmitting device according to the first aspect, or any of the previously described possible implementations thereof, the processor is further configured to determine the pre-processing coefficients of the pre-processor structure into: $g_0 = 1/\sqrt{2}$; and $g_1 = -1/\sqrt{2}$.

An advantage of the concept of setting the pre-processing coefficients of the pre-processor structure to these fixed values such that $g_0^2 + g_1^2 = 1$, computational complexity of the receiving device is even further reduced, further enhancing the above mentioned advantages of reduced receiving device complexity.

In a seventh possible implementation of the transmitting device according to the first aspect, or any of the previously described possible implementations thereof, the processor is further configured to determine the pre-processing coefficients of the pre-processor structure by: setting the square sum of pre-processing coefficients of the pre-processor structure into 1, as an initial value; finding a minimum Euclidean distance of inter symbol interference trellis, based on the obtained channel response; finding the minimum Euclidean distance of the combined response of pre-processor structure and channel; and determining pre-processing coefficients which provide a higher minimum distance.

By reducing the Euclidean distance between symbol sequences, ISI is further reduced.

According to a second aspect, a method is provided in a transmitting device for a wireless communication system, for transmitting data to a receiving device. The method comprises obtaining a channel response. Further the method comprises determining pre-processing coefficients of a pre-processor structure, based on the obtained channel response. In addition, the method also comprises pre-processing data to be transmitted to the receiving device, based on the pre-processor structure and the determined pre-processing coefficients. The method also comprises transmitting the pre-processed data, to be received by the receiving device.

In a first possible implementation of the method according to the second aspect, the method further comprises selecting a pre-processor structure, based on the obtained channel response. Further, the method also comprises informing the receiving device about the selected pre-processor structure.

In a second possible implementation of the method according to the second aspect, or the first possible implementation of the second aspect, the method also comprises transmitting a pilot signal to be received by the receiving device when operating in a FDD mode. Further, the obtained channel response is received from the receiving device.

In a third possible implementation of the method according to the second aspect, or any of the previously described possible implementations thereof, the method comprises receiving an uplink pilot signal, transmitted by the receiving device when operating in a TDD mode. Further, the obtained channel response is computed based on the received uplink pilot signal.

In a fourth possible implementation of the method according to the second aspect, or any of the previously described possible implementations thereof, the pre-processor structure is on the form: $a_k = g_0 \cdot u_k + g_1 \cdot u_{k-1}$, where $g_0$ and $g_1$ are the pre-processing coefficients, $u_k$ and $u_{k-1}$ are input data, k is an index and $a_k$ is the pre-processed data to be transmitted.

In a fifth possible implementation of the method according to the second aspect, or any of the previously described possible implementations thereof, the pre-processor structure is on the form: $a_k = g_0 \cdot u_k + g_1 \cdot u_{k-1} + g_2 \cdot u_{k-2}$, where $g_0$, $g_1$ and $g_2$ are the pre-processing coefficients, $u_k$ and $u_{k-1}$ are input data, k is an index and $a_k$ is the pre-processed data to be transmitted.

In a sixth possible implementation of the method according to the second aspect, or any of the previously described possible implementations thereof, further comprising determining the pre-processing coefficients of the pre-processor structure into: $g_0 = 1/\sqrt{2}$; and $g_1 = -1/\sqrt{2}$.

In a seventh possible implementation of the method according to the second aspect, or any of the previously described possible implementations thereof, the method further comprises determining the pre-processing coefficients of the pre-processor structure by: setting the square sum of pre-processing coefficients of the pre-processor structure into 1, as an initial value; finding a minimum Euclidean distance of inter symbol interference trellis, based on the obtained channel response; finding the minimum Euclidean distance of the combined response of pre-processor structure and channel; and determining pre-processing coefficients which provide a higher minimum distance.

According to a third aspect, a computer program is provided, with a program code for performing a method according to the second aspect, or any of the possible implementations thereof when the computer program runs on a computer.

According to a fourth aspect, a receiving device for a wireless communication system is provided, for receiving data wirelessly from a transmitting device according to the first aspect, or any possible implementation thereof. The receiving device is configured to receive a pilot signal from the transmitting device. Further, the receiving device is configured to compute a channel response by comparing the received pilot signal with an expected pilot signal. The receiving device is also configured to obtain information concerning a pre-processing structure to be utilised when unpacking data received from the transmitting device. In further addition, the receiving device is also configured to receive the pre-processed data from the transmitting device. The receiving device is in addition also configured to unpack the received data, based on the obtained pre-processing structure.

In a first possible implementation of the fourth aspect, the receiving device is furthermore also configured to generate an uplink pilot signal. Further, the receiving device is configured to transmit the generated uplink pilot signal, to be received by the transmitting device.

According to a fifth aspect, a method in a receiving device for a wireless communication system is provided, for receiving data wirelessly from a transmitting device according to the first aspect, or any possible implementation thereof. The method comprises receiving a pilot signal from the transmitting device. Further, the method comprises computing a channel response by comparing the received pilot signal with an expected pilot signal. Further, the method also comprises obtaining information concerning a pre-processing structure to be utilised when unpacking data received from the transmitting device. In further addition, the method also comprises receiving the pre-processed data from the transmitting device. The method in addition also comprises unpacking the received data, based on the obtained pre-processing structure.

In a first possible implementation of the fifth aspect, the method furthermore comprises generating an uplink pilot signal. Further, method also comprises transmitting the generated uplink pilot signal, to be received by the transmitting device.

The advantages of the method according to the second aspect and/or the computer program according to the third aspect, the receiving device according to the fourth aspect and/or the method according to the fifth aspect are the same as those for the corresponding device claims according to the first aspect.

Other objects, advantages and novel features of the aspects of the invention will become apparent from the following detailed description.

BRIEF DESCRIPTION OF THE DRAWINGS

Various embodiments are described in more detail with reference to attached drawings, illustrating examples of embodiments of the invention in which.

DETAILED DESCRIPTION

Embodiments of the invention described herein are defined as a transmitting device and a method in the transmitting device, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
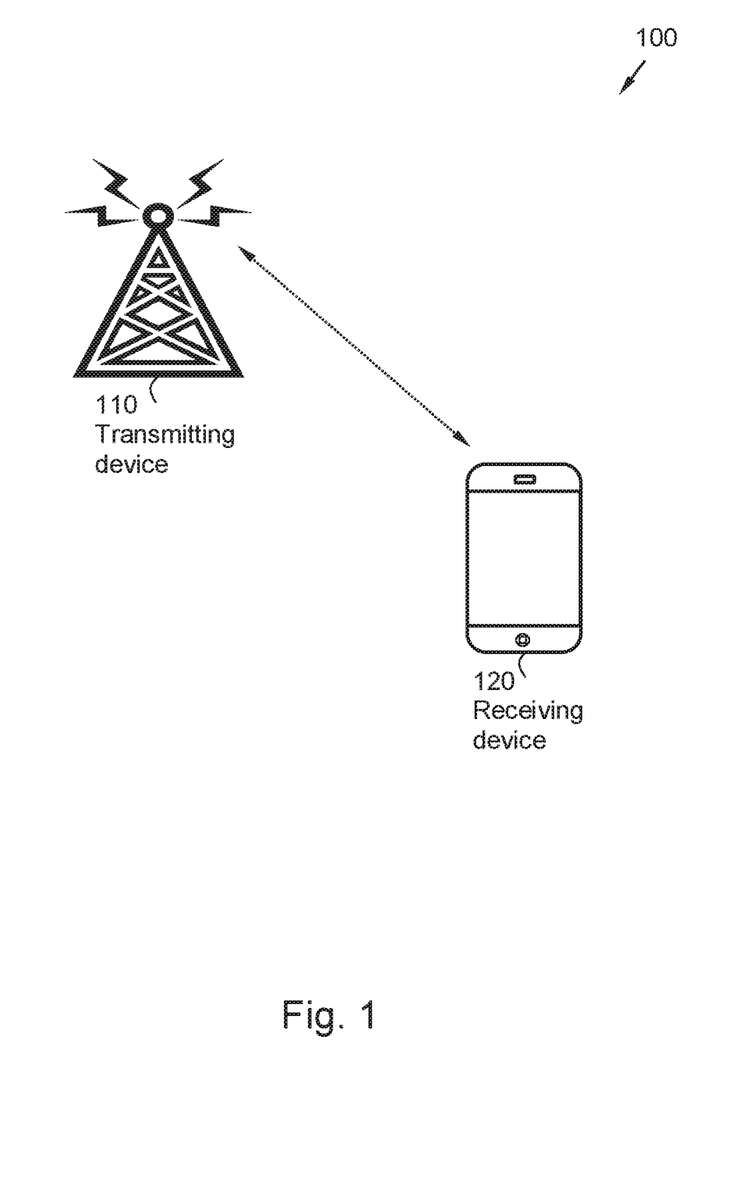
FIG. 1 is a block diagram illustrating a wireless communication system according to an embodiment of the invention.

FIG. 1 is a schematic illustration over a wireless communication network 100 comprising a transmitting device 110, for communication of signals, data and/or data packets over a wireless interface with a receiving device 120.

The transmitting device 110 may according to some embodiments be configured for wireless downlink transmission and may be referred to, respectively, as e.g., a base station, Node B, evolved Node Bs (eNB, or eNode B), base transceiver station, Access Point Base Station, base station router, Radio Base Station (RBS), macro base station, micro base station, pico base station, femto base station, Home eNodeB, sensor, beacon device, relay node, repeater or any other network node configured for communication with the receiving device 120, over a wireless interface, depending, e.g., of the radio access technology and/or terminology used.

The receiving device 120 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with one or more transmitting devices 110, according to different embodiments and different vocabulary.

It is to be noted that the illustrated network setting of one transmitting device 110 and one receiving device 120 in FIG. 1 is to be regarded as a non-limiting example of an embodiment only. The wireless communication network 100 may comprise any other number and/or combination of transmitting devices 110 and/or receiving devices 120 may thus be involved in some embodiments of the disclosed invention.

Thus whenever "one" or "a/an" transmitting device 110 and/or receiving device 120 is referred to in the present context, a plurality of transmitting devices 110 and/or receiving devices 120 may be involved, according to some embodiments.

The wireless communication may be made over a wireless interface comprising, or at least being inspired by radio access technologies such as e.g. 3GPP LTE, LTE-Advanced, E-UTRAN, UMTS, GSM, GSM/EDGE, WCDMA, Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA 2000 1×RTF and High Rate Packet Data (HRPD), or similar technology, just to mention some few possible options, within the wireless communication system 100.

According to the disclosed solution, a pre-processing method is applied to overcome ISI, while maintaining the receiving device complexity at low level, i.e. a relatively simple receiving device 120.

In some embodiments, a two-tap pre-processing is utilised. Alternatively, a three-tap pre-processing may be utilised in some embodiments, as will be discussed.

The output data given in the two-tap pre-processor is on the form:

$$ak = g0 \cdot uk + g1 \cdot uk-1 \quad \text{[Equation 1]}$$

where g0 and g1 are the two taps, which are may be referred to as pre-processing coefficients, uk and uk−1 are input data and ak is the pre-processed data to be transmitted by the transmitting device.

The disclosed solution can improve the channel estimation performance by increasing the minimum Euclidean distance and the solution has been validated through simulations. Contrary to previously known solutions which perform only for the specific channel conditions and need a large number of taps which will exponentially increase the complexity of the receiving device 120, the disclosed solution works well for large range of channel conditions and require low complexity of the receiving device 120.

The provided method and transmitting device may function a bit different when operating in Frequency Division Duplex (FDD) mode and in Time Division Duplex (TDD) mode.

Figure 2A:
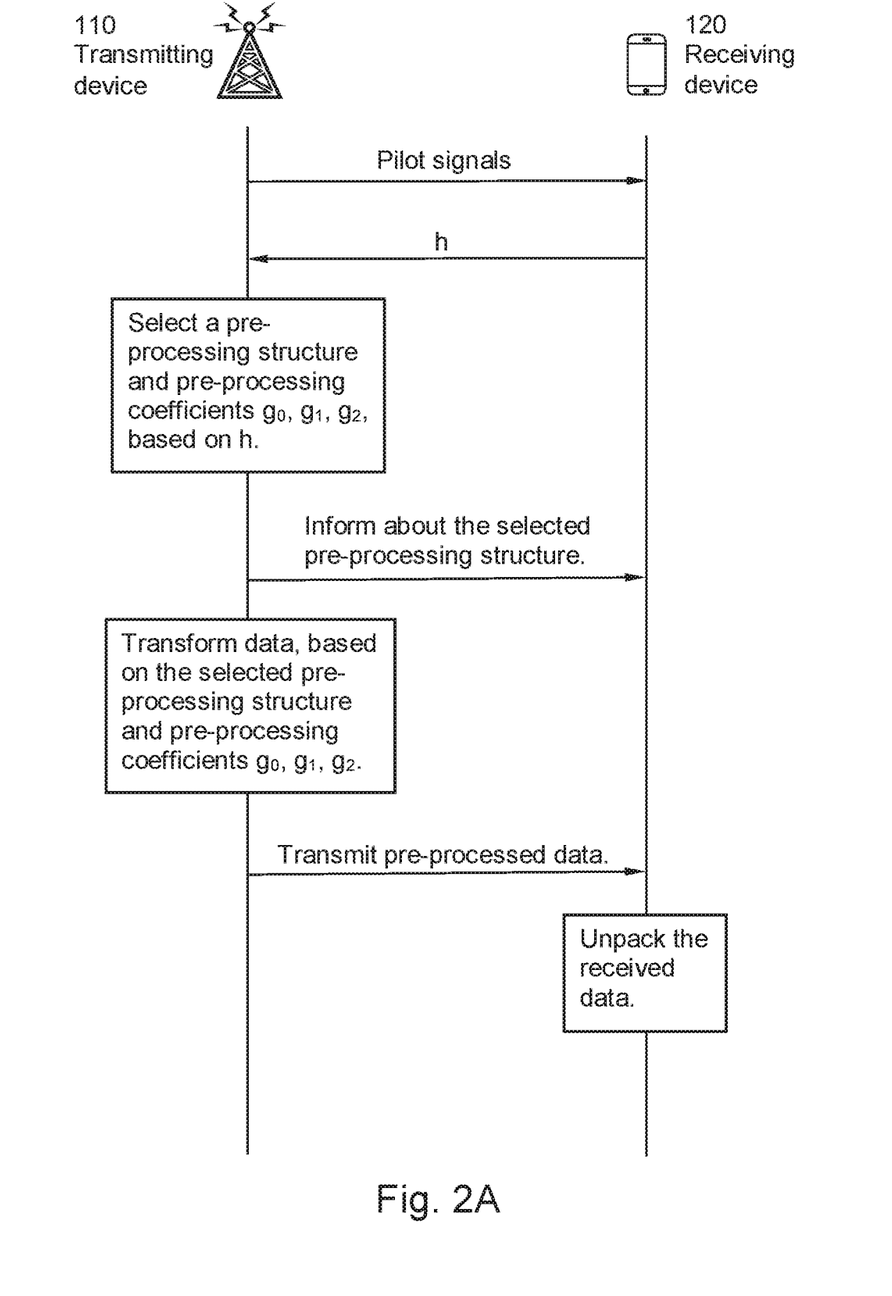
FIG. 2A is a signalling scheme illustrating pre-processing of data at a transmitting device, which is sent to a receiving device according to an embodiment.
Figure 2B:
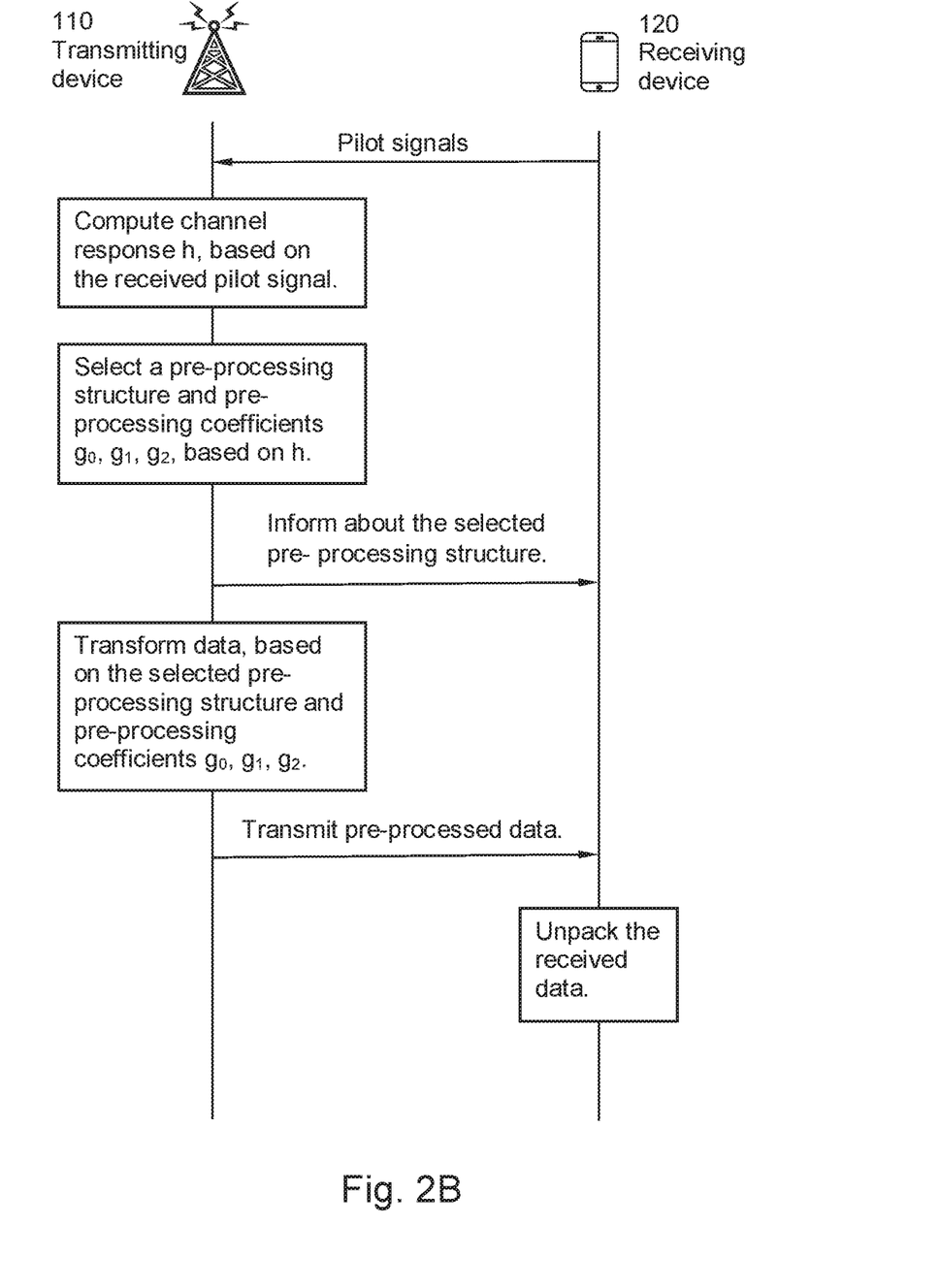
FIG. 2B is a signalling scheme illustrating pre-processing of data at a transmitting device, which is sent to a receiving device according to an embodiment.

The FDD mode embodiment is schematically illustrated in FIG. 2A while the TDD mode embodiment is illustrated in FIG. 2B.

FIG. 2A thus presents an embodiment of the pre-processing method in an FDD environment.

The transmitting device 110 transmits a pilot signal, which is received by the receiving device 120. The receiving device 120, makes signal measurements on the pilot signal as it is received and return a channel response h back to the transmitting device 110.

The pilot signal may be transmitted periodically, in some embodiments, at a predetermined or configurable time interval. The pilot signal comprises pilot symbols which are predefined and known at the receiving device 120. At the receiving device 120, the received pilot signal is compared with the expected ideal pilot signal and based upon the result of such comparison, the channel response h may be prepared and returned.

In the wireless communication network 100, the transmitting device 110 obtains the channel response h, via feedback from the receiving device 120 in the FDD system by measuring pilots sent from the transmitting device 110.

Then, through pre-processing, at the transmitting device 110, it will result in an equivalent channel where the equivalent channel is the result of the pre-processor/pre-processing processing concatenated with the channel response h, i.e. a compensation is made for the transmission deviation from an ideal signal reception, as measured and determined by the receiving device 120 and reported in the channel response h.

The disclosed pre-processor (according to Equation 1) has only two taps. Hence the complexity which is caused upon the receiving device 120, corresponding the pre-processing, is moderate.

Taking a two-tap pre-processor as an example, the pre-processing coefficients for the pre-processor, represented by g0 and g1 in Equation 1 are determined according to the measurement on the channel response h, as mentioned below when a two-tap pre-processor is selected. In some optional embodiments, determining the pre-processing coefficients based on the channel response h, also applies to the three-tap pre-processor.

The principle to choose coefficients g0 and g1 for the pre-processor is that the minimum Euclidean distance of the equivalent channel (by concatenating pre-processing and channel response h) shall be greater than the minimum Euclidean distance of the channel, in some embodiments.

Below is the procedure of the determination of two taps (i.e. the pre-processor coefficients g0 and $g_1$), whether two taps or three taps, the criteria may be the same.

1. Keep square sum of the taps to be unity. One can therefore start with initial values satisfying this criterion.
2. Find the minimum Euclidean distance of inter symbol interference trellis which is based on the channel response for a given modulation scheme.
3. Find the minimum Euclidean distance of a combined response of pre-processor and channel.
4. Determine taps (i.e. pre-processor coefficients g0 and g1), which provide a longer minimum distance.

As the channel taps change, the minimum distance changes. When then regarding the overall new minimum distance and selecting the taps of the pre-processor, subject to the condition that the sum of squares of the taps being unity to keep the energy the same at the transmitting device side, so that the new minimum distance is greater than that of the prior art. As an example, the minimum distance can be computed using e.g., Dijkstra's algorithm at the transmitting device 110.

Dijkstra's algorithm is an algorithm for finding the shortest paths between nodes in a graph in general.

According to the disclosed solution, the channel response is h, the pre-processor is g. The equivalent channel after pre-processing then becomes: f=h⊗g, where ⊗ represents discrete convolution.

The received pilot signal at the receiving device 120 is given by:

$$z_k = \sum_{i=0}^{L-1} f_i a_{k-i} + n_k \quad \text{[Equation 2]}$$

where a is the signal symbol sequence in the time domain, the noise nk is white noise, i and k are indices, L is a limit value; and the (pre-processed) channel response is given by:

$$f^T = [f_0 f_1 \ldots f_{L-1}]. \quad \text{[Equation 3]}$$

Typically, the receiving device 120 may use e.g. the Viterbi algorithm to carry out Maximum Likelihood Sequence Estimation (MLSE) based on the distance d between two symbol sequences, which can be decided as:

$$d^2 = f^T A f \quad \text{[Equation 4]}$$

This is obtained based on the fact, that the distance can be represented using the difference (error) symbols mapped through the ISI trellis diagram. The matrix A is the error correlation matrix. The elements are thus obtained from error symbol sequence. The matrix A is a Toeplitz matrix with the main diagonal element being the largest.

The pre-processing may in some embodiments be set to:

$$g^T = [g_0 = 1/\sqrt{2}\, g_1 = -1/\sqrt{2}]$$

as for a large variety of channel response h, the pre-processor can be kept as the same hence selecting g0, g1 will be similar for different channel responses. Also for quite different channel coefficients, one pre-processor solution is sufficient; the pre-processor solution is robust for high speed scenario where channel response, and thereby also the channel coefficients g0, g1, can vary very much.

The criterion for selection of g0 and g1 is the minimum distance of the combined response which is f. In some embodiments, the coefficients g0, g1 may be kept at fixed values, at least for some channel response types. For example: g0=1/√2; g1=−1/√2.

Thereby, the complexity of processing is further reduced.

In some alternative embodiments, a multi tap pre-processor such as e.g. a three-tap pre-processor may be selected instead of the above discussed two-tap pre-processor, based on the same selection principles. An advantage therewith is that the pre-processor may generate transmission data better adapted to reduce the corrupted effect of the communication channel than the two-tap pre-processor in some embodiments, while still involving low computational complexity.

Multi tap is a possibility in some embodiments, which may be utilised when the increase in minimum distance is smaller than when implementing the two-tap embodiment. The values may be selected conditioned on the energy being normalised (subject to the condition the sum of squares of taps being unity to keep the energy the same at transmitting device 110).

A three-tap pre-processor may be based on the form:

$$a_k = g_0 \cdot u_k + g_1 \cdot u_{k-1} + g_2 \cdot u_{k-2} \quad \text{[Equation 5]}$$

Besides, the disclosed low/moderate complex pre-processor can be coupled with channel coding scheme for better gains, in some embodiments.

FIG. 2B presents an embodiment of the pre-processing method, similar to the one presented in FIG. 2A, but in a TDD environment.

The receiving device 120 transmits an uplink pilot signal, or reference signal such as e.g. a Sounding Reference Signal (SRS). When this is received at the transmitting device 110, a channel response h may be computed, based on the received pilot signal.

Based on the thereby obtained channel response h, pre-processing may be performed at the transmitting device 110, resulting in an equivalent channel where the equivalent channel is the result of the pre-processor/pre-processing concatenated with the channel response, for the purpose of eliminating or at least reducing signal deterioration due to properties of the communication channel.

A pre-processor structure and pre-processing coefficients g0, g1, g2 are then determined according to similar criterions and principles as already discussed above when discussing FIG. 2A and the FDD embodiment.

Also, the receiving device 120 may be informed about the selected pre-processor structure in some embodiments. Such information may be explicitly or implicitly communicated, e.g. by a reference or by being predetermined by a standard under certain criterion, for example.

Thereafter, data to be transmitted by the transmitting device 110 is transformed using the selected pre-processor structure and pre-processing coefficients g0, g1, g2 and transmitted to the receiving device 120, where it is decoded by the receiving device 120.

Figure 3A:
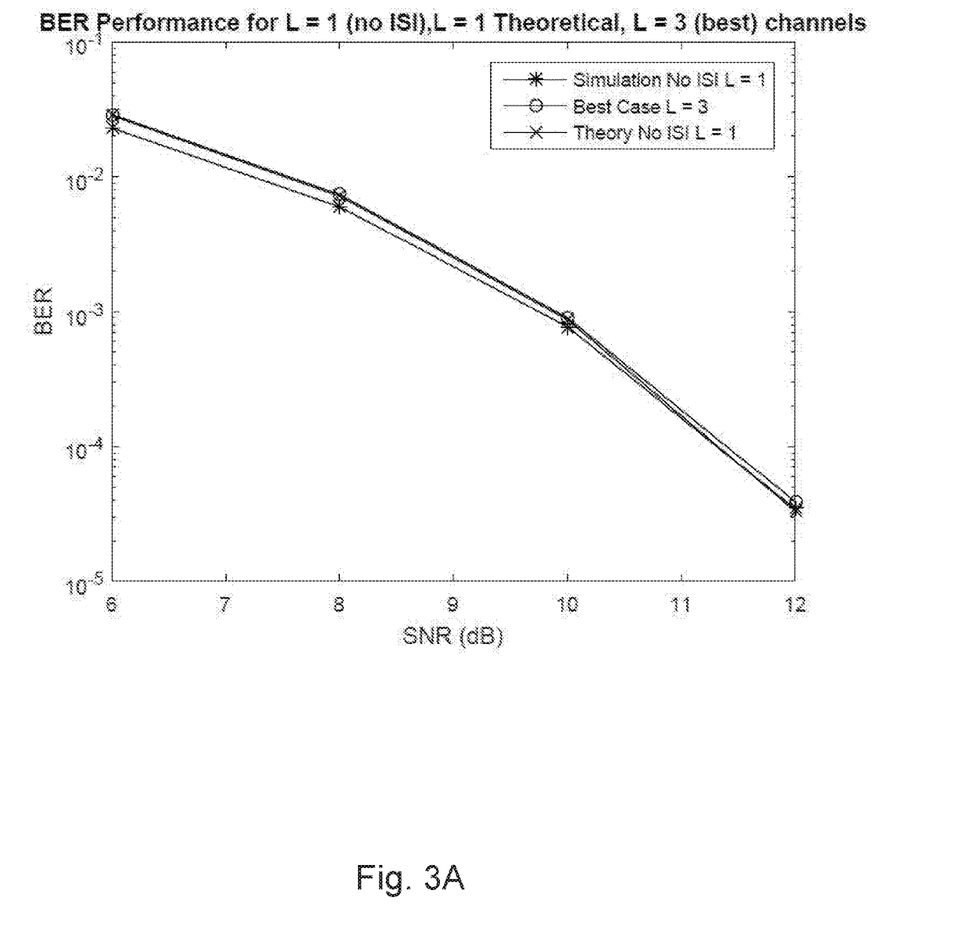
FIG. 3A is a block diagram illustrating BER performance against SNR, according to an embodiment.

FIG. 3A presents an illustration over BER performance against SNR according to an embodiment.

The worst Euclidean distance strictly decreases with the length of ISI. This means that two symbol sequences can be very close in a Euclidean distance sense, in the presence of certain ISI components, which implies that the BER performance becomes significantly worse.

The figure illustrates the best performance for any channel, where the curves overlap with L=1, L=3 channel. L is the number of interfering symbols which contribute to Inter-Symbol Interference; this is a parameter to characterise channel time dispersion. L=1 corresponds to an ideal channel without inter-symbol interference and higher L corresponds to higher inter-symbol interference, in general.

Figure 3B:
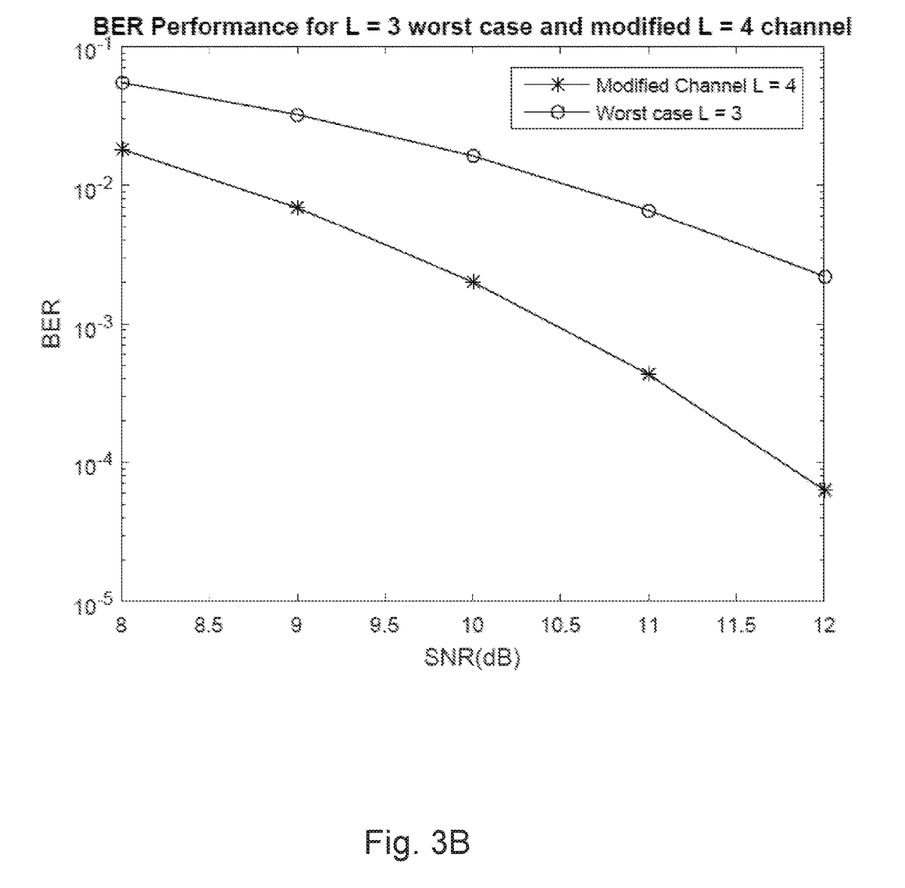
FIG. 3B is a block diagram illustrating BER performance against SNR, according to an embodiment.

FIG. 3B presents an illustration over BER performance against SNR according to an embodiment, where L=3 worst case and modified L=4 channel.

Figure 3C:
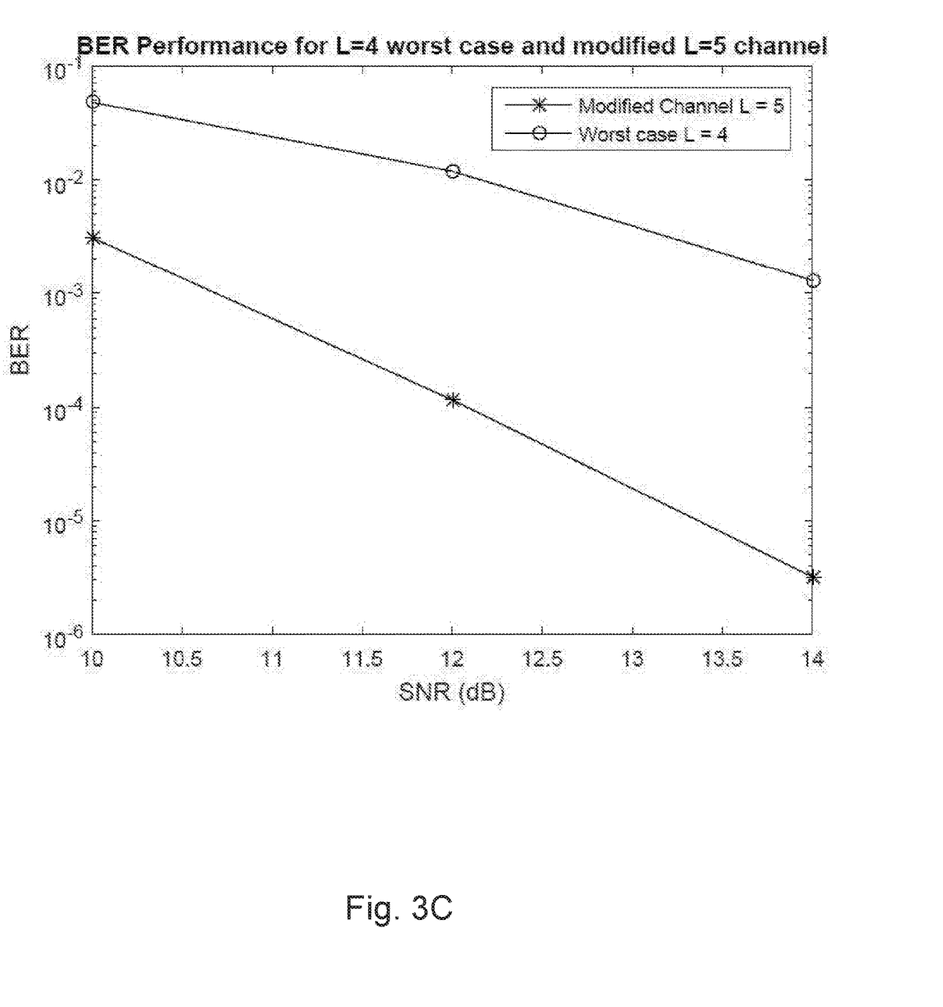
FIG. 3C is a block diagram illustrating BER performance against SNR, according to an embodiment.

FIG. 3C presents an illustration over BER performance against SNR according to an embodiment, where L=4 worst case and modified L=5 channel.

Figure 3D:
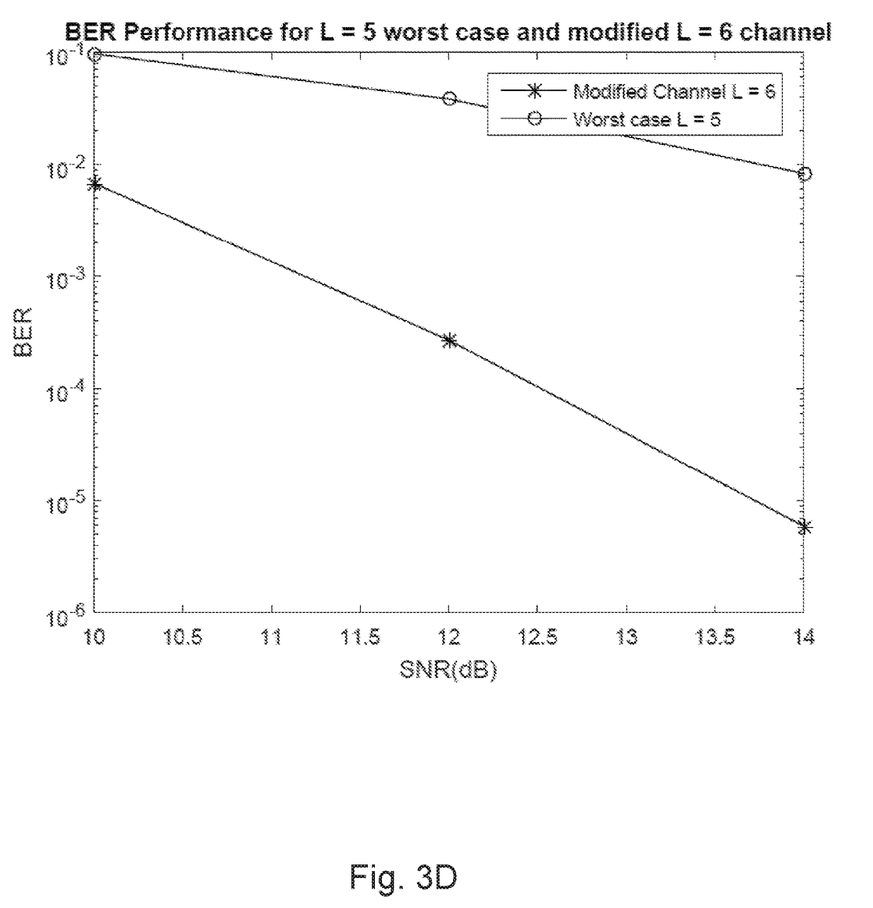
FIG. 3D is a block diagram illustrating BER performance against SNR, according to an embodiment.

FIG. 3D presents an illustration over BER performance against SNR according to an embodiment, where L=5 worst case and modified L=6 channel.

FIGS. 3A-3D show that certain worst case ISI channels may be converted into zero ISI ones in terms of BER performance, in some embodiments.

Figure 4:
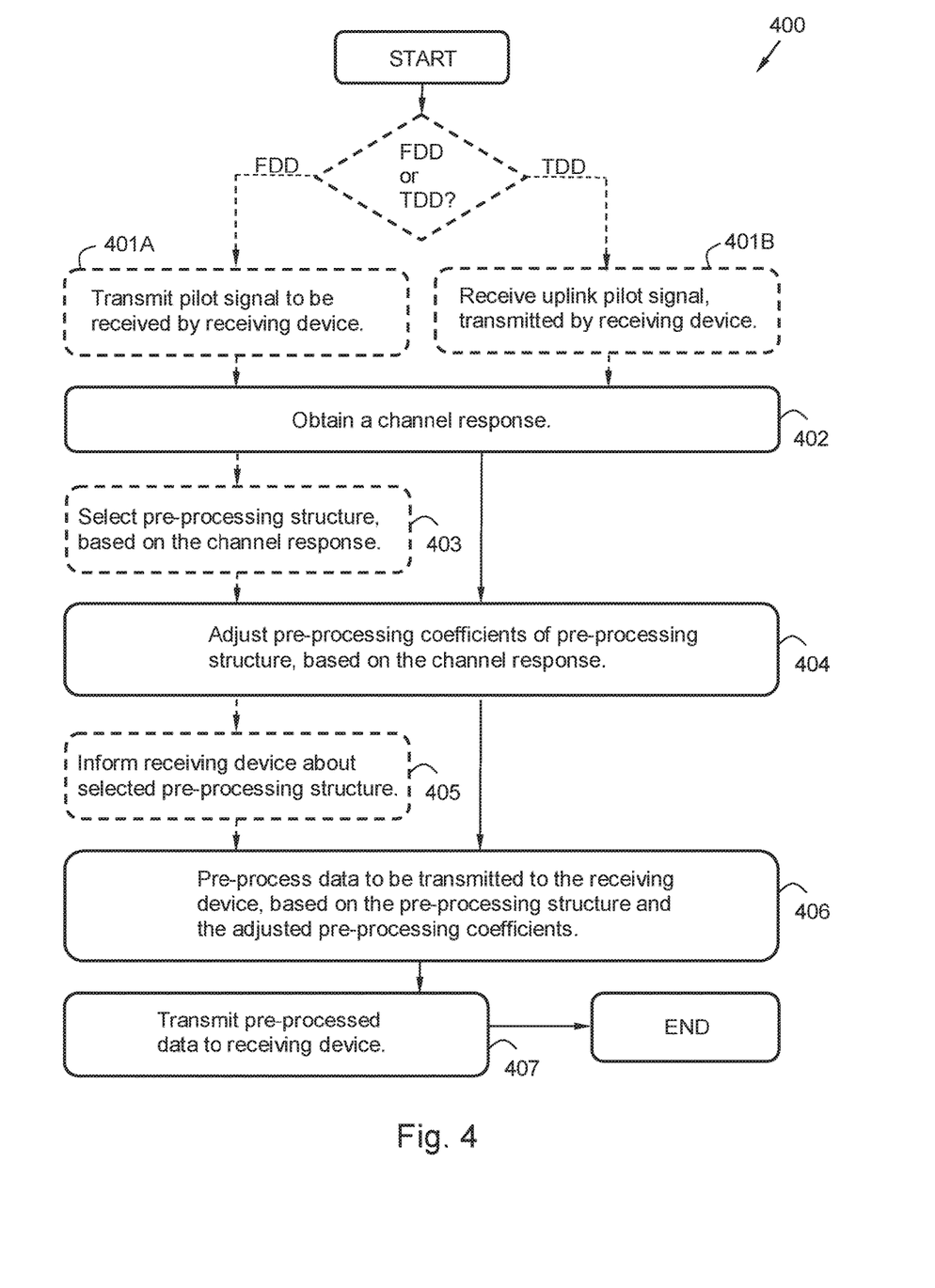
FIG. 4 is a flow chart illustrating a method in a transmitting device according to an embodiment.

FIG. 4 illustrates embodiments of a method 400 for use in a transmitting device 110 for a wireless communication system 100, for transmitting data wirelessly to a receiving device 120.

To appropriately transmit data, the method 400 may comprise a number of actions 401-407.

It is however to be noted that any, some or all of the described step 401-407, may be performed in a somewhat different chronological order than the enumeration indicates, be performed simultaneously or even be performed in a completely reversed order according to different embodiments. Some actions such as e.g. step 401A, 401B, 403, and/or 405 may be performed within some, but not necessarily all embodiments. Further, it is to be noted that some steps may be performed in a plurality of alternative manners according to different embodiments, and that some such alternative manners may be performed only within some, but not necessarily all embodiments.

Any, some or all of steps 401-407 may in some embodiments be periodically reperformed. The method 400 may comprise the following actions:

Step 401A, which only may be performed in some embodiments when the transmitting device 110 is operating in FDD mode, comprises transmitting a pilot signal to be received by the receiving device 120.

Step 401B, which only may be performed in some embodiments when the transmitting device 110 is operating in TDD mode, comprises receiving an uplink pilot signal, transmitted by the receiving device 120.

Step 402 comprises obtaining a channel response h.

In some embodiments, wherein the transmitting device 110 is operating in FDD mode and step 401A has been performed, the obtained channel response h may be received from the receiving device 120.

In some embodiments, wherein the transmitting device 110 is operating in TDD mode and step 401B has been performed, the obtained channel response h may be computed based on the received uplink pilot signal, received from the receiving device 120.

Step 403, which only may be performed in some embodiments, comprises selecting a pre-processor structure, based on the received 402 channel response h.

Thus, in some embodiments, a two-tap pre-processor structure may be selected, in other embodiments, a two-tap pre-processor structure may be selected, e.g. based on the channel response h and thereby the deterioration of the transmission channel.

Step 404 comprises determining pre-processing coefficients g0, g1, g2 of a pre-processor structure, based on the received 402 channel response h.

The pre-processor structure may in some embodiments be on the form: $ak=g0·uk+g1·uk-1$, where g0 and g1 are the pre-processing coefficients, uk is input data and ak is the pre-processed data to be transmitted.

The pre-processing coefficients g0, g1 of the pre-processor structure may be determined into $g0=1/\sqrt{2}$; $g1=-1/\sqrt{2}$, in some embodiments.

Further, in some embodiments, the pre-processor structure may be on the form: $ak=g0·uk+g1·uk-1+g2·uk-2$, where g0, g1 and g2 are the pre-processing coefficients, uk is input data and ak is the pre-processed data to be transmitted.

In some alternative embodiments, the pre-processing coefficients g0, g1, g2 of the pre-processor structure may be determined by: setting the square sum of pre-processing coefficients g0, g1, g2 of the pre-processor structure into 1, as an initial value; finding a minimum Euclidean distance of inter symbol interference trellis, based on the obtained channel response h; finding the minimum Euclidean distance of the combined response of pre-processor structure and channel; and determining pre-processing coefficients g0, g1, g2 which provide a higher minimum distance.

Step 405 comprises informing the receiving device 120 about the selected 403 pre-processor structure, i.e. two-tap pre-processor structure or three-tap pre-processor structure in different embodiments.

Such information may be explicitly sent to the receiving device 120 in some embodiments. In some embodiments, a reference may be made according to a previously made agreement or standard, known by both the transmitting device 110 and the receiving device 120, such as e.g. "0" may mean two-tap pre-processor structure and "1" may mean three-tap pre-processor structure, or vice versa. In yet some embodiments, the receiving device 120 may determine the pre-processor structure based on a standard agreement and based e.g. on the channel response h according to the same criterion as the transmitting device 110 in step 403.

Step 406 comprises pre-processing data to be transmitted to the receiving device 120, based on the pre-processor structure (i.e. two-tap pre-processor structure or three-tap pre-processor structure, possibly selected in step 403) and the determined 404 pre-processing co-efficients g0, g1, g2.

Step 407 comprises transmitting the pre-processed 406 data, to be received by the receiving device 120.

Figure 5:
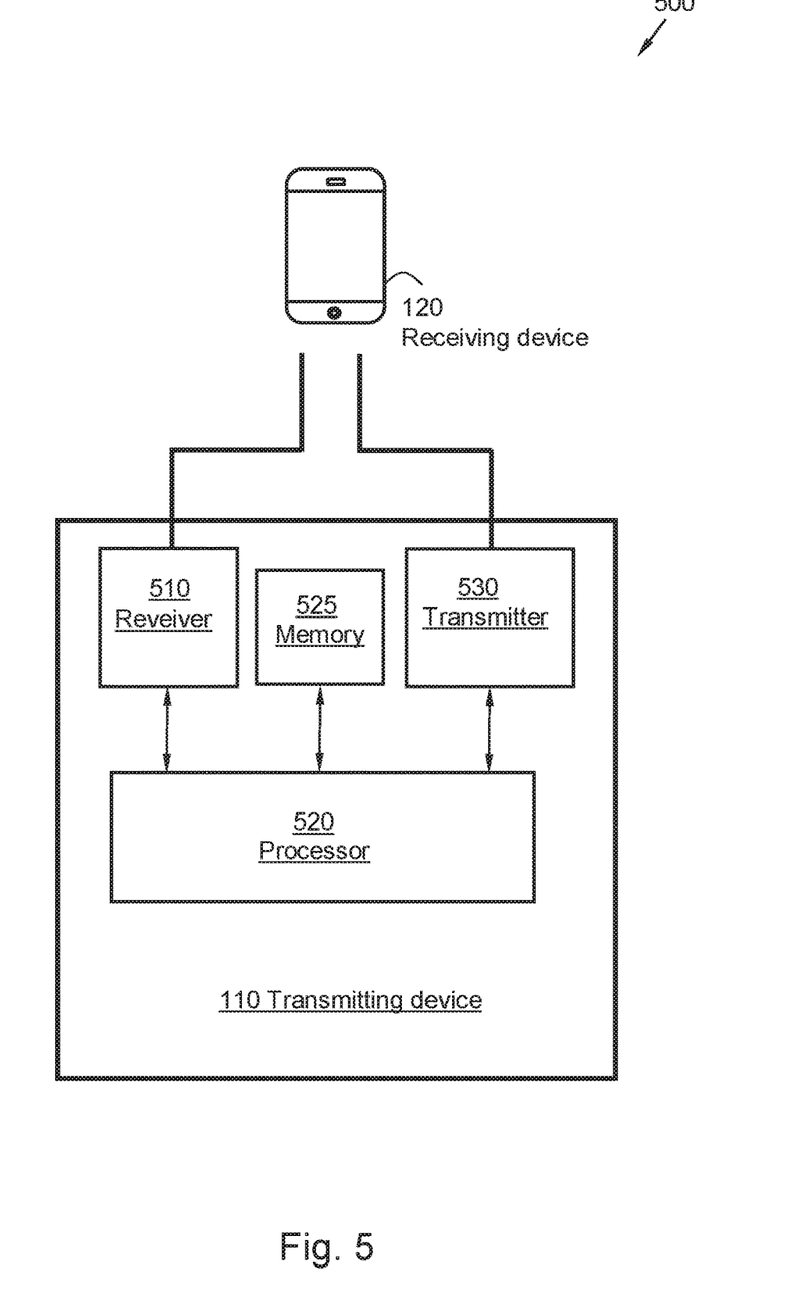
FIG. 5 is a block diagram illustrating a transmitting device according to an embodiment.

FIG. 5 illustrates an embodiment of system 500 for performing at least some method steps 401-407 of the above described method 400. The system 500 comprises a transmitting device 110 for a wireless communication system 100, for transmitting data wirelessly to a receiving device 120.

The transmitting device 110 is configured to obtain a channel response h. The transmitting device 110 is further configured to determine pre-processing coefficients g0, g1, g2 of a pre-processor structure, based on the received channel response h. Furthermore, the transmitting device 110 is also configured to pre-process data to be transmitted to the receiving device 120, based on the pre-processor structure and the determined pre-processing coefficients g0, g1, g2. Additionally, the transmitting device 110 is further configured to transmit the pre-processed data to be received by the receiving device 120.

The transmitting device 110 is configured to perform the method 400 according to any, some, all, or at least one of the enumerated steps 401-407, according to some embodiments.

For enhanced clarity, any internal electronics or other components of the transmitting device 110, not completely indispensable for understanding the herein described embodiments has been omitted from FIG. 5.

The transmitting device 110 may in some embodiments be configured to select a pre-processor structure, based on the received channel response h. Furthermore, the transmitting device 110 may be configured to inform the receiving device 120 about the selected pre-processor structure.

In addition, the transmitting device 110 may be configured to operate in FDD mode and transmit a pilot signal to be received by the receiving device 120 and wherein the obtained channel response h may be received from the receiving device 120.

Further in some alternative embodiments the transmitting device 110 may be configured to operate in TDD mode and receive an uplink pilot signal, transmitted by the receiving device 120. Also, the obtained channel response h may be computed based on the received uplink pilot signal.

In some embodiments, the transmitting device 110 may be configured to determine pre-processing coefficients g0, g1, g2 of a pre-processor structure on the form: $ak=g0·uk+g1·uk-1$, where g0 and g1 are the pre-processing coefficients, uk is input data and ak is the pre-processed data to be transmitted.

In some alternative embodiments, the transmitting device 110 may be configured to determine pre-processing coefficients g0, g1, g2 of a pre-processor structure on the form: $ak=g0·uk+g1·uk-1+g2·uk-2$, where g0, g1 and g2 are the pre-processing coefficients, uk is input data and ak is the pre-processed data to be transmitted.

Furthermore, the transmitting device 110 may also be configured to determine the pre-processor structure into: $g0=1/\sqrt{2}$; and $g1=-1/\sqrt{2}$, in some embodiments.

The transmitting device 110 may also be configured to determine the pre-processing coefficients g0, g1, g2 of the pre-processor structure by: setting the square sum of pre-processing coefficients g0, g1, g2 of the pre-processor structure into 1, as an initial value; finding a minimum Euclidean distance of inter symbol interference trellis, based on the obtained channel response h; finding the minimum Euclidean distance of the combined response of pre-processor structure and channel; and selecting pre-processing coefficients g0, g1, g2 which provide a higher minimum distance.

The transmitting device 110 comprises a receiver 510, configured to receive uplink signals from the receiving device 120 as shown in step 401B.

Further, the transmitting device 110 comprises a processor 520, configured to perform at least some of the previously described method steps 402-406 according to the method 400 for transmitting data and pilot signal to the receiving device 120 as illustrated in step 407 and step 101A, respectively.

Such processor 520 may comprise one or more instances of a processing circuit, i.e. a Central Processing Unit (CPU), a processing unit, a processing circuit, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The transmitting device 110 also comprises a transmitter 530, configured to transmit pre-processed data, to be received by the receiving device 120.

In further addition, the transmitting device 110 may comprise at least one memory 525, according to some embodiments. The optional memory 525 may comprise a physical device utilised to store data or programs, i.e., sequences of instructions, the channel response, the pre-processor structure, on a temporary or permanent basis. According to some embodiments, the memory 525 may comprise integrated circuits comprising silicon-based transistors. Further, the memory 525 may be volatile or non-volatile.

At least a sub-set of the previously described method steps 401-407 to be performed in the transmitting device 110 may be implemented through the one or more processors 520 in the transmitting device 110, together with a computer program product for performing the functions of at least some of the method steps 401-407. Thus a computer program product, comprising instructions for performing the method steps 401-407 may transmit data to the receiving device 120, when the computer program is loaded into the processor 520 of the transmitting device 110.

Thereby a computer program product may comprise a computer readable storage medium storing program code thereon for use by the transmitting device 110, for transmitting data to the receiving device 120. The computer program product may be provided for instance in the form of a data carrier carrying computer program code for performing at least some of the method steps 401-407 according to some embodiments when being loaded into the processor 520. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the transmitting device 110 remotely, e.g., over an Internet or an intranet connection.

The terminology used in the description of the embodiments as illustrated in the accompanying drawings is not intended to be limiting of the described method 400 and transmitting device 110. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A transmitting device in a wireless communication system, the transmitting device comprising:
   a processor configured to:
      obtain a channel response;
      determine processing coefficients based on the channel response, wherein determining the processing coefficients is based on finding a minimum Euclidean distance of inter symbol interference trellis based on the channel response; and
      process the data based on the processing coefficients to generate processed data; and
   a transmitter configured to transmit the processed data to a receiving device;
   wherein processing the data based on the processing coefficients is based on:

$a_k = g_0 \cdot u_k + g_1 \cdot u_{k-1}$, wherein $g_0$ and $g_1$ are the processing coefficients, $u_k$ and $u_{k-1}$ are input data, k is an index, and $a_k$ is the processed data.

2. The transmitting device according to claim 1, wherein the processor is further configured to:
   select a processor structure based on the channel response, wherein the processor structure includes a number of processing steps; and
   inform the receiving device about the processor structure.

3. The transmitting device according to claim 1, wherein the transmitting device operates in a Frequency Division Duplex mode, the transmitting device further comprising:
   a receiver;
   wherein the transmitter is further configured to transmit a pilot signal; and
   wherein the receiver is configured to receive the channel response based on the pilot signal transmitted by the transmitter.

4. The transmitting device according to claim 1, wherein the transmitting device operates in a Time Division Duplex mode, the transmitting device further comprising:
- a receiver configured to receive an uplink pilot signal from the receiving device;
- wherein the processor is further configured to obtain the channel response by computing the channel response based on the uplink pilot signal received by the receiver.

5. The transmitting device according to claim 1, wherein the processing coefficients comprise $g_0$ and $g_1$, and determining the processing coefficients is based on:

$$g_0 = 1/\sqrt{2}; \text{ and}$$

$$g_1 = -1/\sqrt{2}.$$

6. A method for transmitting data, the method comprising:
- obtaining, by a transmitting device in a wireless communication system, a channel response;
- determining, by the transmitting device, processing coefficients based on the channel response, wherein determining the processing coefficients is based on finding a minimum Euclidean distance of inter symbol interference trellis based on the channel response;
- processing, by the transmitting device, data based on the processing coefficients to generate processed data; and
- transmitting the processed data to a receiving device;
- wherein processing the data based on the processing coefficients is based on:

$$a_k = g_0 \cdot u_k + g_1 \cdot u_{k-1},$$

wherein $g_0$ and $g_1$ are the processing coefficients, $u_k$ and $u_{k-1}$ are input data, k is an index, and $a_k$ is the processed data.

7. The method according to claim 6, further comprising:
- selecting a processor structure based on the channel response, wherein the processor structure includes a number of processing steps; and
- informing the receiving device about the processor structure.

8. The method according to claim 6, wherein the transmitting device operates in a Frequency Division Duplex mode, the method further comprising:
- transmitting a pilot signal to the receiving device;
- wherein the channel response is received from the receiving device based on the pilot signal.

9. The method according to claim 6, wherein the transmitting device operates in a Time Division Duplex mode, the method further comprising:
- receiving an uplink pilot signal transmitted by the receiving device;
- wherein the channel response is computed based on the uplink pilot signal.

10. A non-transitory computer readable storage medium storing a computer program with program code that when executed cause a transmitting device to perform the steps of:
- obtaining a channel response;
- determining processing coefficients based on the channel response, wherein determining the processing coefficients is based on finding a minimum Euclidean distance of inter symbol interference trellis based on the channel response;
- processing data based on the processing coefficients to generate processed data; and
- transmitting the processed data to a receiving device;
- wherein processing the data based on the processing coefficients is based on:

$$a_k = g_0 \cdot u_k + g_1 \cdot u_{k-1},$$

wherein $g_0$ and $g_1$ are the processing coefficients, $u_k$ and $u_{k-1}$ are input data, k is an index, and $a_k$ is the processed data.

11. The computer readable storage medium according to claim 10, the steps further comprising:
- selecting a processor structure based on the channel response, wherein the processor structure includes a number of processing steps; and
- informing the receiving device about the processor structure.

12. The computer readable storage medium according to claim 10, wherein the transmitting device operates in a Frequency Division Duplex mode, the steps further comprising
- transmitting a pilot signal to the receiving device;
- wherein the channel response is received from the receiving device based on the pilot signal.

13. The computer readable storage medium according to claim 10, wherein the transmitting device operates in a Time Division Duplex mode, the steps further comprising:
- receiving an uplink pilot signal transmitted by the receiving device;
- wherein the channel response is computed based on the uplink pilot signal.

* * * * *